Nov. 12, 1957    Z. W. WHITEHOUSE ET AL    2,812,866
METHOD AND APPARATUS FOR CHARGING FURNACES
Filed July 17, 1951    2 Sheets-Sheet 1
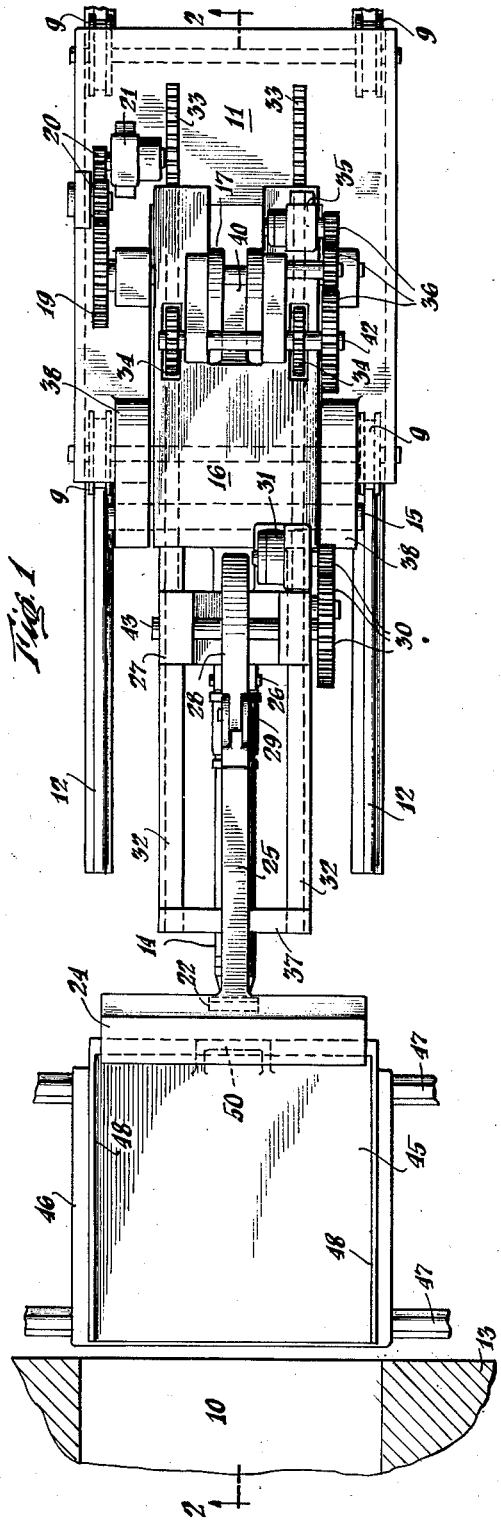
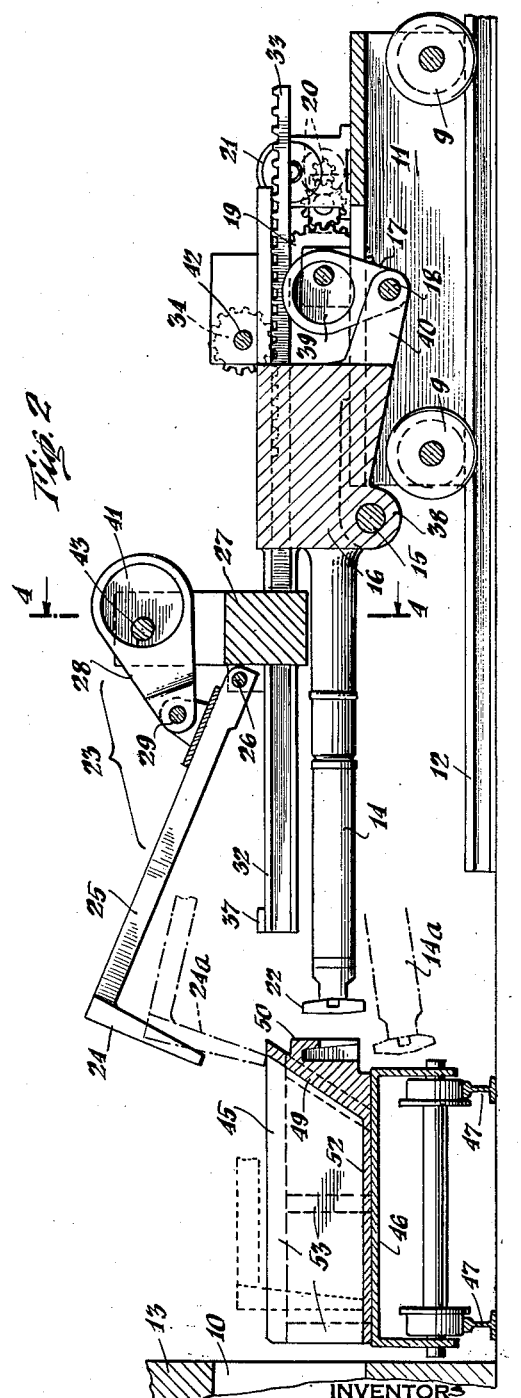
INVENTORS
ZEBULON W. WHITEHOUSE
OSCAR M. SCHULZE
BY HANS F. FISCHER
Robert S. Dunham
ATTORNEY

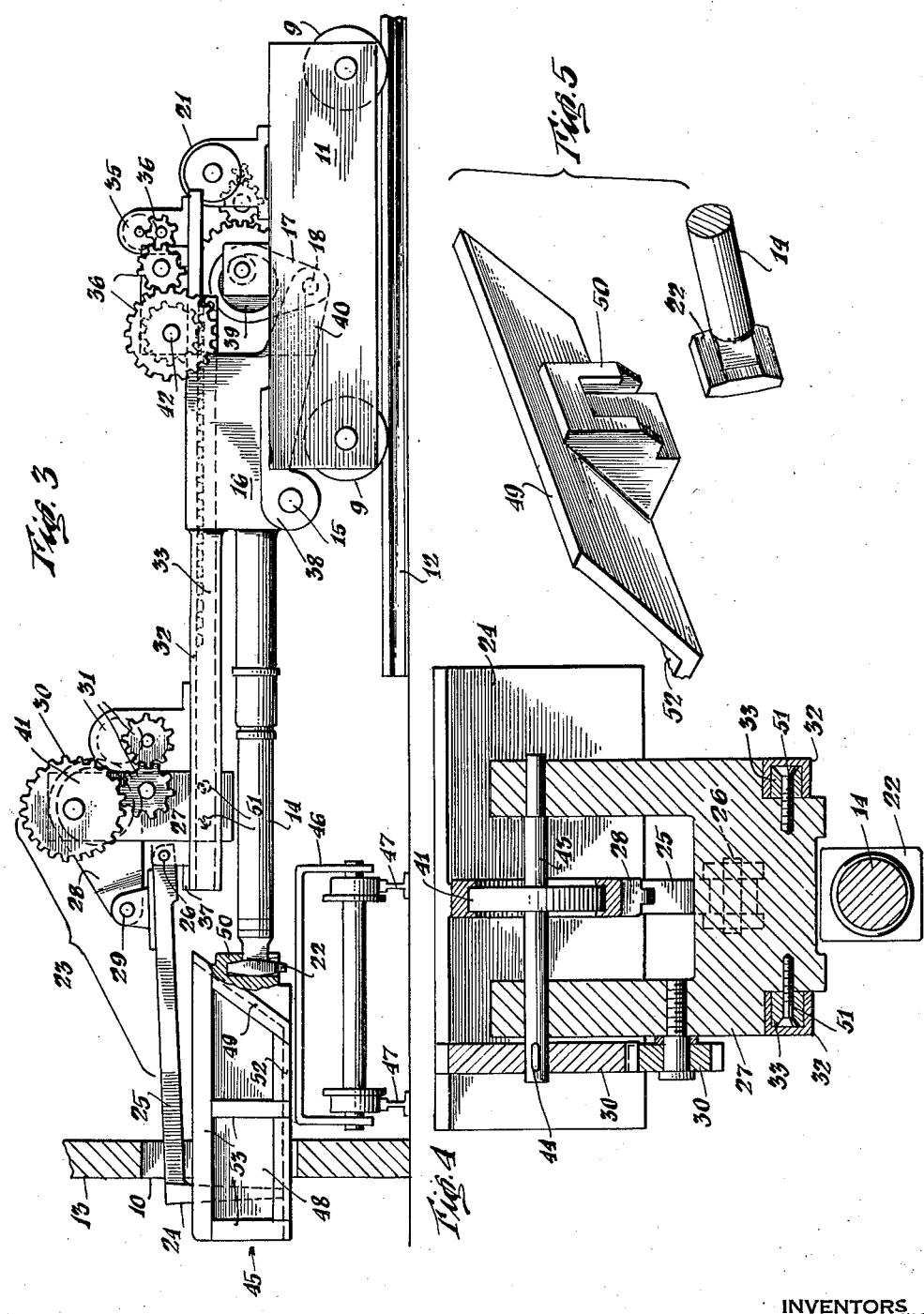

United States Patent Office 2,812,866
Patented Nov. 12, 1957

2,812,866

METHOD AND APPARATUS FOR CHARGING FURNACES

Zebulon W. Whitehouse and Oscar M. Schulze, Canton, and Hans F. Fischer, Cleveland, Ohio, assignors to Republic Steel Corporation, Cleveland, Ohio, a corporation of New Jersey Application July 17, 1951, Serial No. 237,112

10 Claims. (Cl. 214—29)

This invention deals with a method and apparatus for charging furnaces, specifically for use in charging open hearth or electric furnaces, e. g. with scrap of all kinds. The standard practice in charging such furnaces has been to use a rather small box or container for the material to be charged and to carry such container into the furnace on a peel which is attached to a charging vehicle. The peel is then rotated within the furnace to turn the container over completely to discharge the contents. After withdrawal from the furnace, the empty box is removed from the peel and replaced by another loaded one, it being understood that the mill is equipped with a considerable number of the charging boxes, which are loaded with scrap and transported to the furnaces for the charging practice just described.

In this cumbersome and rather laborious practice various difficulties have been encountered, namely, the loss of some of the charging containers from the peel into the furnace, as well as damage to the roof of the furnace, and heavy strain on the peel and its supports upon rotating the container, as it tends to shift or flop on the end of the peel while turning. The necessity for turning the charging box inside the furnace has prevented loading the furnace to a high level and has also limited the size of the boxes, with corresponding economic disadvantage. While some proposals have been made to empty charging boxes in other ways, the suggested means have involved some complex and therefore unduly costly or nonrugged mechanism in each box, or have required elaborate design or reconstruction of the peel and charging machinery, so that the general practice in charging has remained as described above.

One object of the present invention is to provide improved apparatus whereby a large yet simple and rugged container for the charge may be used. The primary advantage from using a large container or box is an increase in efficiency in charging the furnace. Some of the reasons for this increase in efficiency are that fewer containers are necessary, less preparation of the scrap or other material to be loaded in the container is required, fewer charging cars are needed and less charges for each heat of the furnace. Also, it is quicker to make a complete charge of the furnace while at the same time there is less spillage and hence more accuracy of the charge, i. e. in attaining a desired weight of charge.

Another object of the present invention is to provide new, simplified and effective means and procedure to eliminate turning of the charging container in order to discharge the contents. In addition to permitting the use of large charging boxes if desired, the present apparatus produces the advantage of having no loss of the containers from falling off the peel. Furthermore, the furnace may be charged to a higher level and hence, for example, a larger quantity of scrap may be charged into the furnace at one time so that fewer charges are necessary for a single heat.

A further object of this invention, also achieved by enabling the use of a large charging container or box, is to provide arrangements such that fewer charging cars are needed for conveying a charge to the furnace, and less containers have to be filled for each charge. Attainment of these results means more space and hence greater ease of handling and less congestion on the open hearth charging floor.

Other objects of the invention likewise stem from the use of large charging containers, as realized with the novel means for dumping the scrap from them into the furnace. The increase in size of containers means that each can be more densely loaded, i. e. to provide a larger load per cubic foot of box, and that much scrap may be charged without any preparation, e. g. in place of prepared or baled scrap.

Another object is to provide improved furnace charging apparatus, employing a simple, rugged, one-piece type of box, and embodying new and effective means for discharging scrap from the box without turning the latter, such means being conveniently associated with a peel of conventional nature and requiring no elaborate reconstruction of charging machines as now designed and used.

To these and other ends, an advantageous embodiment of the invention is described below and shown in the drawings, by way of example to disclose the features and principles of improvement.

In the drawings:

Fig. 1 shows a plan view of a charging vehicle and a container located in front of a furnace door;

Fig. 2 shows a side view of the apparatus illustrated in Fig. 1, partly in section, taken along the line 2—2 looking in the direction of the arrows;

Fig. 3 shows a side view of the apparatus with the parts shown in the position of discharging the container;

Fig. 4 shows a view partly in cross section of the pusher mechanism from the back of the same, i. e. this view being taken along the line 4—4 of Fig. 2 looking in the direction of the arrows; and Fig. 5 shows an enlarged detail in perspective of the slanted side of the container and the peel-receiving lug, as well as the head member of the peel.

Referring first to Figs. 1 and 2 for specific details of the apparatus embodying the present invention, there is shown a charging machine that includes a vehicle 11, which operates along a pair of rails 12 by means of wheels 9. It will be understood that in customary types of charging apparatus, the rails 12 may be supported on a carriage (not shown) movable on another track at right angles to the illustrated rails so that the machine can be rolled into working position before any one of a row of furnaces. Either as positioned by such carriage or otherwise, the rails 12 may be assumed to be located in front of a door 10 through which a furnace 13 is to be charged. The furnace may be any suitable type, e. g. an open hearth (or electric) furnace as employed for the production of steel. The vehicle may be moved along the rails 12 toward and away from the furnace door 10, by driving means which are not shown but may be any convenient mechanism for propelling the vehicle horizontally.

A conventional peel 14 is attached to the front of the vehicle and may be pivoted about a shaft 15 on which the framework 16 of the peel is supported. In the present apparatus, this framework 16 also supports track members 32 by means of their being integrally attached to the framework as shown, and the track members 32, projecting forwardly parallel to the peel, carry a pusher mechanism generally indicated at 23 which will be described in detail, below. The framework 16 extends rearwardly, i. e. away from the furnace, in order to support a pair of pinions 34 and a reversible motor 35 for driving them (Figs. 1 and 3 only), which motor and pinions effect horizontal positioning of the pusher mechanism by means of two racks 33 that respectively slide in the track members 32. This horizontal displacement of the pusher mechanism is described in greater detail below.

Thus, it should be noted that the framework 16 with all its integral members is carried on, and supported by, the shaft 15 which is journaled in bearing members 38 integrally attached to the vehicle 11. The pivotal motion, which rocks the peel up and down about the axis of the shaft 15, is accomplished by means of a connecting link 17 which is pivotally attached to an arm 40 of the framework 16 by means of a shaft 18. The link 17 also pivots or turns about an eccentric 39, that is rotated by means of a gear 19 which is driven, through reduction gears 20, by the output of a reversible motor 21. Thus, when the motor turns the eccentric 39, the pivot shaft 18 is moved toward or away from the shaft of the eccentric and the arm 40 is raised or lowered so as to rock the peel 14 correspondingly. The peel 14 has a head member 22 which is of generally rectangular shape and of considerably larger dimensions than the neck portion just behind it, and which is adapted to engage a lug on a charge container in a manner described below.

The pusher mechanism indicated generally by reference numeral 23 comprises a hoe-shaped pusher plate 24 (which may have a somewhat wedge-like configuration) on the end of an arm 25. This arm is pivoted at the shaft 26 which is carried by a frame 27. The arm 25 is positioned, i. e. swung about the shaft, by a connecting link 28 which is pivotally attached to the arm by means of the shaft 29 and its supporting lugs on the arm. The connecting link 28 is driven by an eccentric 41 which in turn is driven by reduction gears 30 as shown in Figs. 1 and 3. These gears effect the necessary reduction from a reversible motor 31 located on the framework 27 of the pusher mechanism. As indicated above, the framework 27 may be moved horizontally along the track members 32 (which extend from and are integral with framework 16 on the peel) by means of the racks 33 and pinions 34. The pinions 34 are carried on a common shaft 42, which shaft is driven by a motor 35 and reduction gears 36, appropriately carried by the framework 16. There is a limiting stop member 37 which joins the ends of the track members 32 and limits the outward travel, i. e. toward the furnace of the framework 27 and the pusher.

Referring to Fig. 4, some details of the pusher mechanism will be further clarified. The hoe-shaped pusher plate 24 may be seen in a raised position as indicated in Fig. 2. The plate is raised and lowered by means of the link 28 which is shown partly in section in order to reveal the eccentric 41 which in turn is fastened to the shaft 43. The lower end of the link 28 is pivotally fastened to the arm 25 by means of the shaft 29 (Figs. 1, 2 and 3), which is here hidden from view. The shaft 43 is rotated by means of the reduction gears 30, two of which are shown in Fig. 4. The largest of these reduction gears 30 is keyed to the shaft 43 by means of key 44 as shown, in order to position the eccentric and hence the pusher plate as desired. The framework 27 is shown in cross section which illustrates how it is slidably carried on the track members 32 and is also guided and positioned by the racks 33. It will be noted that the track members 32 are U-shaped in cross section and that the racks 33 slide in the hollow of these track members. The racks 33 are each secured to the framework 27, as by means of the bolts 51 or other suitable fastening arrangement. Shown below the framework 27 is a cross section of the peel 14 (Figs. 1, 2 and 3), which has a rectangular head 22 as explained above.

The charging box or container 45 is carried into position in front of the furnace door by means of a car 46 which travels on rails 47, the arrangement being such that successive cars, each carrying one or more boxes loaded with iron or steel scrap or other required material, may thus be brought up between the charging machine and the furnace. The improved container 45 consists of a three-sided, steel, box-like structure which has two vertical side walls 48, a slanted side wall 49 joining them at the rear, and a bottom 52, the box being located with its rear side 49 farthest away from the furnace door. To save weight, the vertical sides 48 may be enclosed with thinner sheet or plate than the plates used for the slanted side 49 and the bottom 52, but are braced with heavy frames 53 (Figs. 2 and 3) in order to maintain sufficient rigidity and provide ample strength for the box as a whole. It will also be noted that the box 45 is preferably of solid construction, all welded into one piece. For removable support by the peel, the charging container carries, on its rear wall, a lug 50 (Figs. 1, 2, 3 and 5), of the nature of a box-like receptacle or socket, open at the bottom and such that the head 22 of the peel 14 can be squarely fitted into it. When so supported, the box cannot rock or turn appreciably, relative to the peel. It will further be noted that the width of the container 45 between its vertical sides 48 is such that the hoe-shaped pusher plate 24 may enter, and preferably just fits, between these sides, i. e. so that it can be moved freely toward the open end of the box.

Operation

To describe the operation of the apparatus, we will refer to Figs. 2 and 3 which show various positions of the charging instrumentalities. In Fig. 2 the apparatus is shown with the charging container 45 in position on its car 46 in front of the furnace door 10, and with the charging vehicle 11 ready to be moved forward to engage the charging container 45. As the vehicle 11 is advanced toward the furnace 13, the peel 14 is first rocked down into the dotted line position shown at 14a in Fig. 2, i. e. by suitably controlled operation of the driving means 21—19, 39, 17 and 40 to turn the peel assembly about the axis of the horizontal shaft 15. Thereupon the same driving means is operated in the reverse direction, so that the peel 14 is rocked up to cause its head member 22 to engage the lug 50. After engagement in the lug, the peel 14 is further raised, lifting the charging box 45 off its car 46; if necessary, the forward advance of the charging machine is temporarily interrupted while the peel head is thus fitted into the lug and the box lifted from the car. Then the forward motion of the charging vehicle 11 is continued, to carry the box through the door into the furnace 13.

Before this operation is completed, however, the pusher mechanism 23 is operated (by its driving mechanism 31, 30, 41 and 28) in such a manner as to raise the pusher plate 24 up high enough to clear the back, i. e. the slanted side 49 of the container 45. Then the pusher is lowered, i. e. rocked downwardly (by its driving mechanism) about the pivot 26, as the charging vehicle is moved forward, in such a way as to have the pusher plate 25 come in contact with the inner face of the slanted side 49 of the box, the entering position of the pusher being shown in dotted lines 24a in Fig. 2. It will be understood that before the pusher plate is brought down to this position, and indeed usually before any downward motion of the pusher plate is initiated, the peel 14 will have been rocked upward at least enough to have the head 22 engage the lug 50 on the container 45 as previously described. Furthermore, in order to bring the plate 24 into its precise entering position 24a at the inner top edge of the box wall 49, some forward or backward displacement of the pusher head or frame 27 may first or simultaneously be necessary, by operating the motor 35 and the gearing 36—34 to advance or retract the racks 33.

Then preferably after the leading, open end of the box 45 has entered the furnace (i. e. if the nature of the load is such that there might otherwise be danger of spilling some of it outside the furnace) but before advancing the box beyond a position such as shown in Fig. 3 (i. e. if the top of the door 10 is too low to accommodate the pusher plate in elevated position), the pusher plate 24 is rocked further and simultaneously advanced by forward motion of the racks 33, so that it slides down, e. g. more or less along the inner face of the wall 49, to the bottom 52 of the box 45, getting behind the material in the container which is to be charged into the furnace. Indeed by this operation, dislodgment of the load of scrap in the box is usually initiated. Now with the peel 14 supporting the charge box 45 and the pusher plate 24 down behind the charge, everything is ready for completion of the operation of discharging the contents of the box into the furnace, the box remaining in some such position as shown in Fig. 3, or if desired, being first advanced, by forwardly moving the vehicle 11 and with it the entire apparatus, to a location further inside the furnace. When the desired position of the container has thus been reached, the pusher plate 24, without further displacement about its pivot 26, is moved toward the open side of container 45 by means of the motor 35, which drives the racks 33 forward and thereby slides the whole pusher mechanism 23 along the track members 32. Thus the plate 24 is advanced, with its lower edge more or less sliding along the bottom 52 of the box, to a position such as indicated at 24b (dotted lines) in Fig. 2 or in solid lines in Fig. 3, and by such operation the load of scrap or the like is pushed off, i. e. discharged, into the furnace in the desired location.

As will now be apparent, Fig. 3 illustrates the apparatus when it has been used to deposit a load at a place in the furnace near the door 10, the machine being shown with the container 45 positioned part way through the furnace door and with the pusher plate 24 extended to or nearly to its furthest position. In all cases, after the material has been discharged from the box 45 into the furnace 13, the box is withdrawn and replaced onto its car 46 by a reverse series of steps, so that the operation may be repeated, as desired, with successive, freshly loaded, identical boxes, brought up on further cars to the unloading position shown. In the withdrawing stage, the vehicle 11 is first moved backward to bring the box 45 over the car 46, the pusher plate 24 is then elevated about its pivot 26 and retracted by rearward drive of the racks 33, and the peel 14 is rocked downwardly (and finally retracted), so that the box is seated on the car and the peel head 22 is disengaged and pulled away from the lug 50.

It will be seen that the invention, especially, as exemplified in the described apparatus, fulfills the various objects set forth above and affords particularly convenient means for charging furnaces with scrap or the like. Since the charging box need not be turned over in the furnace, it may advantageously be much larger, e. g. having a capacity of from 4 to 6 times that of the conventional charging boxes now commonly in use. Thus with the present apparatus, fewer boxes are necessary to charge the same total load; indeed, the larger box can be more densely loaded, thus even providing a larger amount of load per unit volume of the box. Likewise with the container or box of larger volume, the loading operation in the stock house is much easier, often permitting use of unprepared scrap in place of prepared or baled material. In hauling the boxes to the furnaces, the load per car is larger, thus requiring fewer charging car loads and reducing congestion in the vicinity of the furnaces; with fewer cars to convey the same amount of scrap, less motive power is required for each drag or train, thereby facilitating delivery of scrap, while maintenance is reduced by the less frequent use of charging cars.

As also explained, the disadvantages of turning over the charging container are obviated, e. g. avoiding damage to the furnace roof and undesirable shocks and loads on the peel mechanism. Loss of boxes in the furnaces will not occur with the present apparatus, as has often happened when the conventional small boxes are turned over. Furthermore, there is room to pile the charge higher in the furnace, so that a greater amount of scrap can be introduced at one time, reducing the number of charges needed for a given heat of the furnace. The charging box itself is of rugged and simple construction, involving no separate or moving parts, yet all of the described advantages are achieved with the improved mechanism for removably supporting the box and for discharging its contents into the furnace.

One specific embodiment of the invention has been described. This is not to be considered as limiting the invention in any way, but merely as illustrating the invention, which may be embodied in other forms without departure from its spirit.

We claim:

1. In a furnace charging apparatus for handling scrap, the combination comprising a container for scrap, having its forward side open and having a rear side wall and a bottom, means for moving said container forwardly along a substantially horizontal path into a furnace, and scrap-ejecting means for the container mounted to be moved with the container along said path by said moving means, and, including a pusher having translation means for causing said pusher to enter the container downwardly adjacent the said rear wall, and means for moving said pusher downwardly and horizontally, to introduce said pusher between the scrap and the said wall and to push the scrap out of the container into the furnace.

2. In a furnace charging apparatus, the combination comprising a box-like charging container having its forward side open and adapted to hold a load of material to be charged, means removably engageable with the container for moving the container along a substantially horizontal path into a furnace forward side first, and material-ejecting means for the container, including a remote pusher mounted to rock about a horizontal axis relative to the container, to enter the container downwardly at a locality remote from its said open side, and to move with the container along said horizontal path, and means for moving said pusher about said axis and horizontally, to introduce the pusher downwardly into the container behind the load of material and to advance the pusher for displacing said material out of said open forward side.

3. In furnace charging apparatus the combination which comprises charging vehicle means having a peel mounted thereon, said peel having a head member and being pivotally mounted on said vehicle means to allow said head member to swing up and down about a horizontal axis, said vehicle means being disposed to travel horizontally toward and away from said furnace, charge container means comprising lug means adapted to be engaged by said head member, an inwardly sloping side wall, and a bottom, means pivotally movable relative to said peel for engaging said side wall and for sliding across said bottom to thereby discharge the contents of said container means.

4. In furnace charging apparatus the combination which comprises charging vehicle means having a peel mounted thereon, said peel having a head member and being pivotally mounted on said vehicle means to allow said head member to swing up and down about a horizontal axis, said vehicle means being disposed to travel horizontally toward and away from said furnace, charge container means comprising lug means adapted to be engaged by said head member, an inwardly sloping side wall, two vertical side walls adjacent to said sloping wall and a bottom, pusher means pivotally movable relative to said peel and adapted to fit between said vertical side walls, and means for causing said pusher means to move substantially horizontally in said container to discharge said charge into said furnace.

5. The combination as claimed in claim 4, in which said pusher means is hoe-shaped.

6. In a furnace charging apparatus, the combination comprising a peel having a head for removable engagement with a charging container to support the container, means for moving the peel toward and away from the interior of a furnace, means for rocking the peel about a horizontal axis to elevate and depress its head, a pusher mounted adjacent said peel to rock about a horizontal axis relative to the peel for entry downwardly into a container supported on the peel head, and means for moving the pusher downwardly about its horizontal axis and horizontally in material-ejecting direction relative to the peel, to insert the pusher in said supported container and to push material out of the container into the furnace.

7. In a furnace charging apparatus, the combination comprising a charging machine which comprises a peel having a head for removable engagement with a charging container to support the latter, means for moving the peel toward and away from the interior of a furnace, and means for rocking the peel about a horizontal axis to elevate and depress its head, and means carried by the charging machine for ejecting material from a container supported on the peel head, including a pusher adapted to enter the supported container, and means for moving the pusher downwardly into the container and horizontally therein in material-ejecting relation, said pusher being mounted for downward and horizontal movement by said last mentioned means relative to the peel.

8. In furnace charging apparatus the combination which comprises charging vehicle means having a peel thereon and being movable horizontally toward and away from said furnace for charging the same, said peel having a head member, pusher means located on said vehicle means and movable relative thereto with two degrees of freedom, a charge container having a lug adapted to be engaged by said head member, said pusher means and peel being so constructed and arranged that a charge in said container may be placed in said furnace at a desired location and said charge discharged by means of said pusher means.

9. In furnace charging apparatus, the combination which comprises charging vehicle means having a peel thereon and being movable horizontally toward and away from said furnace for charging the same, said peel having a head member, hoe-shaped pusher means located on said vehicle means and movable relative thereto with two degrees of freedom, a charge container comprising lug means adapted to be engaged by said head member, an inwardly sloping side wall, two side walls adjacent said sloping side wall, and a bottom, all whereby a charge in said container may be placed in said furnace at a desired location and discharged by means of said pusher means.

10. In furnace charging apparatus, the combination which comprises charging vehicle means having a peel mounted thereon, said peel having a head member and being pivotally mounted on said vehicle means to allow said head member to swing up and down about a horizontal axis, said vehicle means being disposed to travel horizontally toward and away from said furnace, charge container means comprising lug means adapted to be engaged by said head member, a fixed inwardly sloping side wall, two vertical side walls adjacent to said sloping wall and a bottom, hoe-shaped pusher means pivotally movable relative to said peel and adapted to fit between said vertical side walls, and means for causing said pusher means to move substantially horizontally in said container to discharge said charge into said furnace.

References Cited in the file of this patent

UNITED STATES PATENTS

| | | |
|---|---|---|
| 716,750 | Patterson | Dec. 23, 1902 |
| 775,211 | Doss | Nov. 15, 1904 |
| 864,934 | Taylor | Sept. 3, 1907 |
| 1,079,126 | Hayes | Nov. 18, 1913 |
| 2,405,342 | Brosius | Aug. 6, 1946 |
| 2,576,974 | Smith et al. | Dec. 4, 1951 |

FOREIGN PATENTS

| | | |
|---|---|---|
| 431,250 | France | Sept. 6, 1911 |